(12) United States Patent
Hanaki et al.

(10) Patent No.: US 12,091,889 B2
(45) Date of Patent: Sep. 17, 2024

(54) MOTOR-VEHICLE DOOR LATCH DEVICE

(71) Applicant: MITSUI KINZOKU ACT CORPORATION, Yokohama (JP)

(72) Inventors: Naoki Hanaki, Yokohama (JP); Shuntaro Kimura, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 180 days.

(21) Appl. No.: 17/461,085

(22) Filed: Aug. 30, 2021

(65) Prior Publication Data

US 2022/0065006 A1    Mar. 3, 2022

(30) Foreign Application Priority Data

Sep. 1, 2020 (JP) ................................ 2020-146969

(51) Int. Cl.
| | |
|---|---|
| *E05B 81/16* | (2014.01) |
| *B60J 5/04* | (2006.01) |
| *E05B 81/06* | (2014.01) |
| *E05B 81/30* | (2014.01) |
| *B60J 5/06* | (2006.01) |
| *E05B 79/20* | (2014.01) |

(52) U.S. Cl.
CPC ............ *E05B 81/16* (2013.01); *B60J 5/0468* (2013.01); *E05B 81/06* (2013.01); *E05B 81/30* (2013.01); *B60J 5/06* (2013.01); *E05B 79/20* (2013.01)

(58) Field of Classification Search
CPC .......... E05B 81/06; E05B 81/14; E05B 81/16; E05B 81/18; E05B 81/20; E05B 81/30; E05B 81/34; E05B 81/36; E05B 81/42; E05B 81/90; E05B 83/36; E05B 83/40; E05B 79/20; E05B 79/02; E05B 79/08
See application file for complete search history.

(56) References Cited

U.S. PATENT DOCUMENTS 7,770,946 B2 *   8/2010  Kouzuma ............... E05B 81/20
                                                     292/216
9,464,466 B2 * 10/2016  Nozawa ................ E05B 85/243
(Continued)

FOREIGN PATENT DOCUMENTS

JP          6035586       11/2016

*Primary Examiner* — Kristina R Fulton
*Assistant Examiner* — Noah Horowitz
(74) *Attorney, Agent, or Firm* — NIXON & VANDERHYE

(57) ABSTRACT

A motor-vehicle door latch device includes an engagement mechanism including a latch and a ratchet, a base plate fixed to a body housing the engagement mechanism, a casing fixed to the base plate such that a first side surface faces a side surface on a vehicle-exterior side of the base plate, a releasing mechanism including a releasing lever, a locking/unlocking mechanism enabling the ratchet to disengage from the latch and vice versa, an electric mechanism including a locking/unlocking motor and a releasing motor, and a closure mechanism rotating the latch from a half-latched position to a fully-latched position, wherein all members forming the releasing mechanism, the locking/unlocking mechanism, and the electric mechanism are arranged on a second side surface opposite the first side surface of the casing, and all members forming the closure mechanism are arranged between the first side surface of the casing and the base plate.

7 Claims, 13 Drawing Sheets

(56) References Cited

U.S. PATENT DOCUMENTS

| | | | |
|---|---|---|---|
| 10,378,252 B2* | 8/2019 | Ottino | E05B 81/68 |
| 10,907,384 B2* | 2/2021 | Damboiu | E05B 81/42 |
| 11,441,336 B2* | 9/2022 | Nam | E05B 65/1026 |
| 11,459,803 B2* | 10/2022 | Tametani | E05B 81/36 |
| 11,668,121 B2* | 6/2023 | Nam | E05B 77/38 |
| | | | 292/201 |
| 2015/0376918 A1* | 12/2015 | Nagaoka | E05B 85/02 |
| | | | 292/195 |
| 2020/0332570 A1* | 10/2020 | Tomaszewski | E05B 81/34 |
| 2021/0372169 A1* | 12/2021 | Patane | E05B 81/34 |
| 2022/0042352 A1* | 2/2022 | Ney | E05B 81/90 |

* cited by examiner

MOTOR-VEHICLE DOOR LATCH DEVICE

This application claims priority to JP Patent Application No. 2020-146969 filed 1 Sep. 2020, the entire contents of which is hereby incorporated by reference.

BACKGROUND OF THE INVENTION

Field of the Invention

The present invention relates to a motor-vehicle door latch device that is fixed to a door of a motor vehicle and is engaged with a striker on a body to hold the door in a closed position.

Description of the Related Art

The invention described in JP 6,035,586 B has a formation in that a door latch device, an electric closure device, and a relay operating device are arranged in a door, wherein the electric closure device drives a latch of the door latch device to forcibly operate the door from an ajar position to a fully-closed position, and wherein the relay operating device controls to relay each door opening operation of an outside handle and an inside handle provided on the door respectively and transmits each of the relayed door opening operations to the door latch device.

The door latch device has a formation in that, on one side surface facing a vehicle-exterior side of a metal base plate, there are arranged members for forming a door closure device and various kinds of members each of which is coupled with the relay operating device via a motion transmission member including a rod or a Bowden cable.

The relay operating device comprises;

a locking/unlocking mechanism including members each of which is arranged in a position apart from the door latch device and is shiftable between an unlocked state and a locked state, wherein the unlocked state enables a door opening operation of an outside handle and an inside handle on the basis of motive power of a motor, and wherein the locked state disables the door opening operation; and a releasing lever operating on the basis of the door opening operation of the outside handle and inside handle when the locking/unlocking mechanism is in the unlocked state, wherein the releasing lever is connected with any of the members of the door latch device via each of the motion transmission members.

SUMMARY OF THE INVENTION

However, since the relay operating device is arranged apart from the door latch device in the invention of JP 6,035,586 B, not only components may be increased because the motion transmission members are required to transmit the operation of the releasing lever of the relay operating device to the door latch device, but also an assembling operation efficiency may be lowered because the relay operating device and the door latch device are independently assembled to the door.

To cancel the above-described increasing of the motion transmission members and the above-described lowering of the assembling operation efficiency, there is an idea that the locking/unlocking mechanism and the releasing lever of the relay operating device are arranged on the base plate of the door latch device. However, such an arrangement requires that many members are concentratively arranged on the base plate, therefore causes an upsizing of the base plate and also the door latch device, and may exert a bad influence on assembling efficiency of the door latch device to the door.

In view of the above disadvantages of the conventional techniques, an object of the present invention is to provide a motor-vehicle door latch device that makes it possible to optimize its assembling operation for a door, to reduce its component members, and to downsize itself.

According to the present invention, the above problems are solved as follows. Namely, the motor-vehicle door latch device of the present invention fixed to a door and holding the door in a closed position by engaging with a striker on a body, comprises;

an engagement mechanism that comprises a latch engaging with the striker and a ratchet engaging with the latch when the door is closed;

a base plate that is fixed to a body housing the engagement mechanism and is provided with a striker entrance groove into which the striker enters when the door is closed;

a casing fixed to the base plate such that a first side surface faces a side surface on a vehicle-exterior side of the base plate;

a releasing mechanism comprising a releasing lever that is released on the basis of a door opening operation of a manual opener device provided on the door;

a locking/unlocking mechanism capable of shifting between an unlocked state and a locked state, wherein the unlocked state enables the ratchet to disengage from the latch by making it possible to transmit a releasing operation of the releasing lever to the ratchet and the locked state disables the ratchet to disengage from the latch by making it impossible to transmit the releasing operation of the releasing lever to the ratchet;

an electric mechanism comprising a locking/unlocking motor that is capable of shifting the locking/unlocking mechanism electrically between the unlocked state and the locked state and a releasing motor that enables the releasing lever to be released electrically; and a closure mechanism rotating the latch from a half-latched position to a fully-latched position, characterized in that all members forming the releasing mechanism, the locking/unlocking mechanism, and the electric mechanism are arranged on a second side surface opposite the first side surface of the casing that faces the side surface of the base plate, and in that all members forming the closure mechanism are arranged between the first side surface of the casing and the base plate.

According to the present invention, all of the members forming the closure mechanism are arranged between the first side surface of the casing that faces the side surface on the vehicle-exterior side of the base plate and the base plate, and all of the members forming the releasing mechanism, the locking/unlocking mechanism, and the electric mechanism are arranged on the second side surface opposite the first side surface of the casing. Therefore, it is possible to downsize the casing, to reduce the motion transmission members for connecting with a relay operating device as in a conventional formation, and to optimize its assembling operation for the door.

DESCRIPTION OF THE PREFERRED EMBODIMENTS

Figure 1:
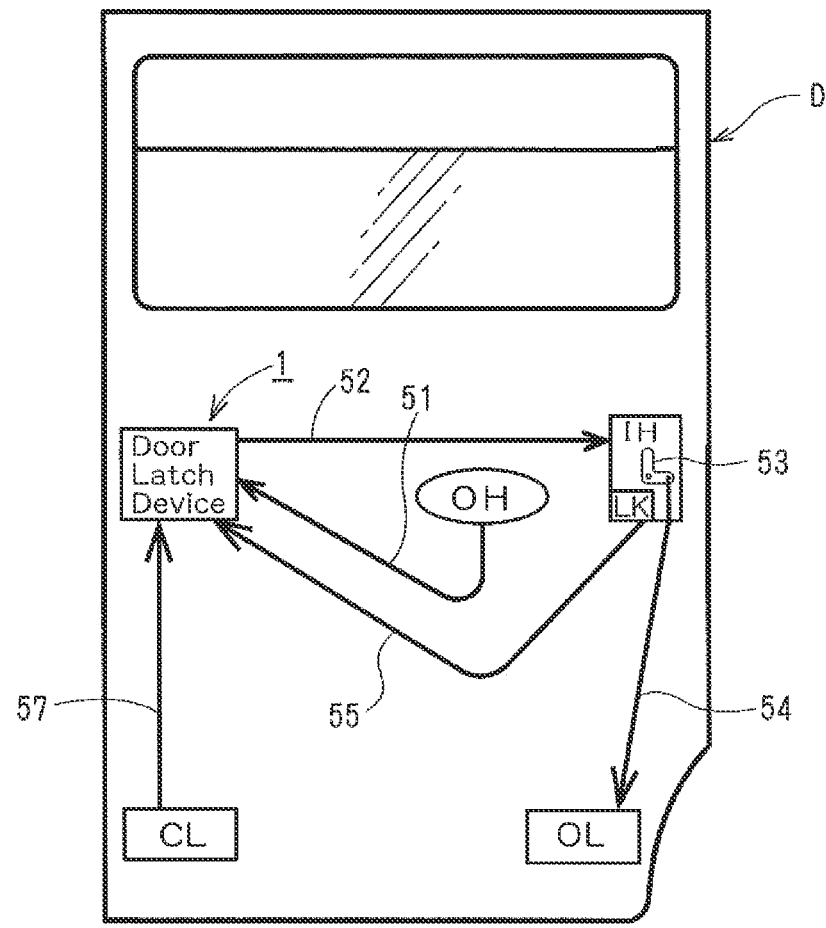
FIG. 1 is a schematic side elevational view showing a door to which a door latch device of the present invention is fixed.

An embodiment according to the present invention is described with the drawings as follows. FIG. 1 is a schematic view showing a sliding door (referred to as "door" below) D that is supported to a side of a body of a motor vehicle so as to be capable of opening and closing in a longitudinal direction.

An inside of the door D is provided with a door latch device 1 for holding the door D in a fully-closed position and an electric closure device CL that operates the door latch device 1 to forcibly close the door D from a door ajar position (this is just before the fully-closed position and corresponds to a half-latched state of the door latch device 1) to a fully-closed position (this corresponds to a fully-latched state of the door latch device 1). A side surface on a vehicle-exterior side (an outer panel) of the door D is provided with an outside handle (a manual opener device in the vehicle-exterior side) OH that is operated when the door D is opened and closed from a vehicle exterior. A side surface on a vehicle-interior side (an inner panel) of the door D is provided with an inside handle (a manual opener device in the vehicle-interior side) IH that is operated when the door D is opened and closed from a vehicle interior and a locking operation knob LK that is operated when a locking/unlocking mechanism described below of the door latch device 1 is shifted between an unlocked state and a locked state by a manual operation. A front lower portion of the door D is provided with a fully-open-latch device OL for holding the door D in a fully-open position. As necessary, the body is provided with an electric opening/closing device (not shown) for electrically moving the door D to open and close.

The fully-open-latch device OL holds the door D in the fully-open position by engaging with a striker designed for fully open (not shown) provided on the body when the door D is in the fully-open position, and enables the door D to close by disengaging from the striker designed for fully open. Incidentally, a detailed explanation of the fully-open-latch device OL is omitted because this device is not directly concerned with the present invention.

As shown in FIGS. 2 to 5, the door latch device 1 comprises a base plate 2 formed in an L-like shape in a plan view and made of metal, a body 3 made of a synthetic resin and fixed to a rear portion of the base plate 2, a casing 4 made of a synthetic resin and fixed to the base plate 2 such that a first side surface 41 of the casing 4 faces a side surface on a vehicle-exterior side of the base plate 2, a side cover 5A made of a synthetic resin and closing a second side surface 42 that is opposite to the first side surface 41 of the casing 4 and faces the vehicle-exterior side, and a top cover 5B made of a synthetic resin and covering upper mating faces between the casing 4 and the side cover 5A.

The base plate 2 has a member arrangement portion 2a facing an internal side surface of the inner panel of the door D and a cover portion 2b formed to be bent in an L-like shape at the rear portion of the member arrangement portion 2a. A corner portion of the bent portion is provided with a striker entrance groove 2d into which a striker S engaging with a latch 7 of an engagement mechanism described below enters when the door D is closed. The body 3 is fixed to an internal surface of the inner panel of the door D together with the cover portion 2b of the base plate 2. The side cover 5A and the top cover 5B have a function to prevent rainwater from invading into the casing 4.

An inside of the body 3 is provided with the engagement mechanism for holding the door D in the closed position by engaging with the striker S on the body. The engagement mechanism comprises the latch 7 and a ratchet 9, wherein the latch 7 is pivotally supported by a latch shaft 6 oriented to a substantially longitudinal direction and is engaged with the striker S when the door D is closed, and wherein the ratchet 9 is pivotally supported by a ratchet shaft 8 oriented to the substantially longitudinal direction and is capable of selectively engaging with each of a fully-latched engagement portion 7a and a half-latched engagement portion 7b formed on a peripheral edge of the latch 7.

Figure 2:
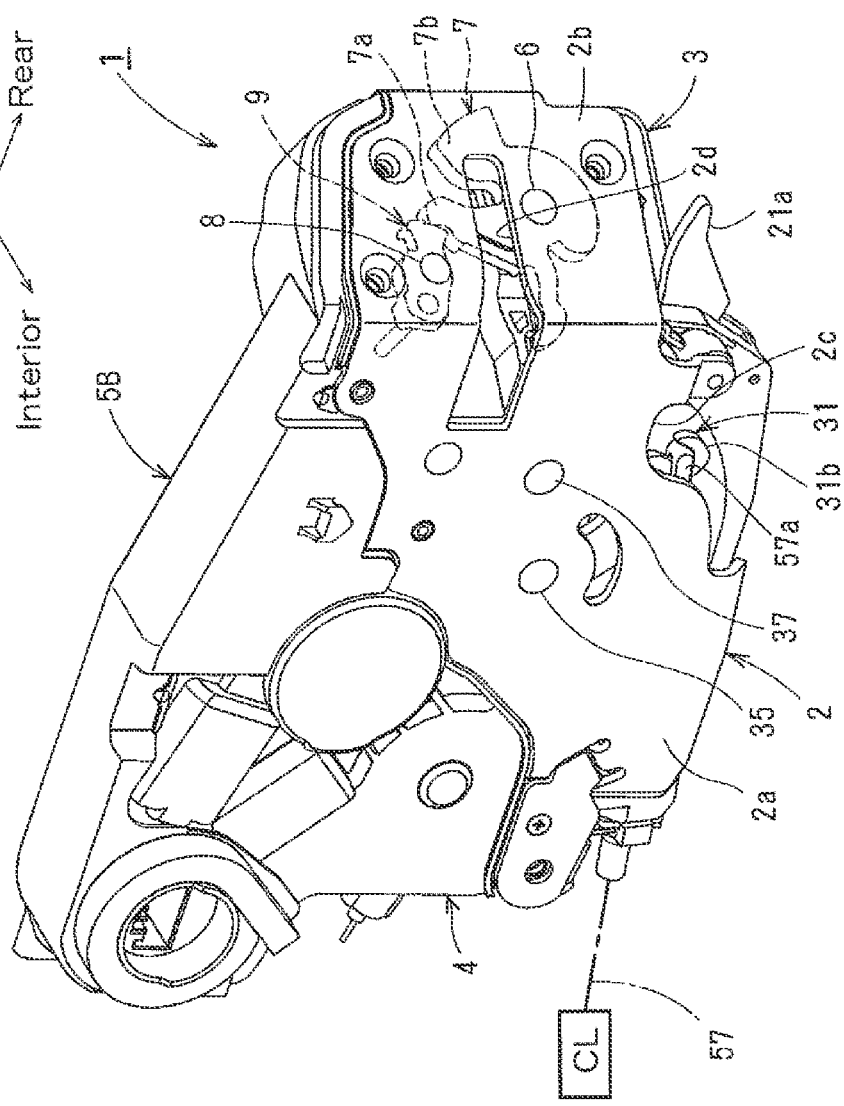
FIG. 2 is a perspective view showing the door latch device viewed from an obliquely rearward direction in a vehicle interior side.
Figure 3:
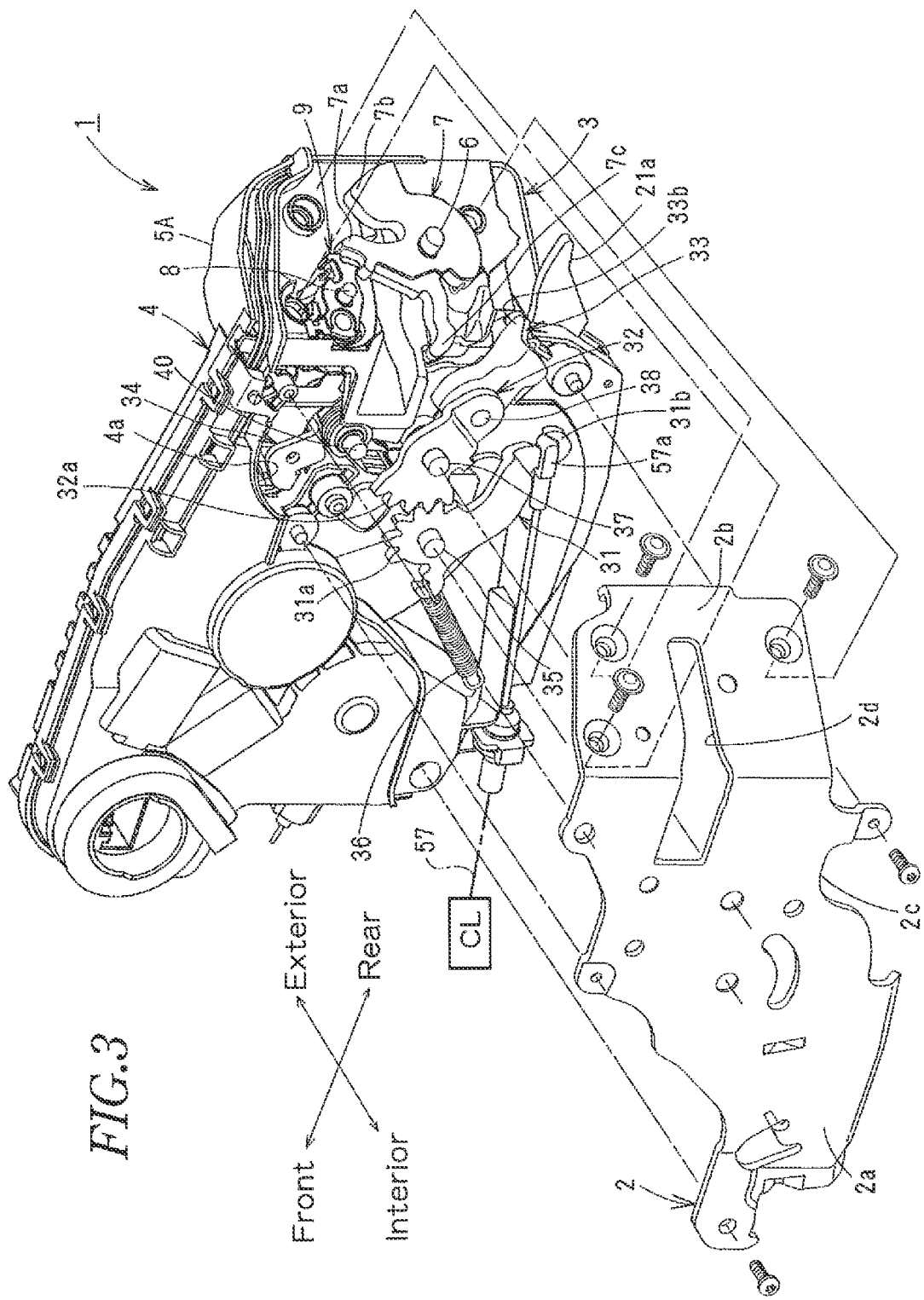
FIG. 3 is an exploded perspective view showing a principal part of the door latch device viewed from the obliquely rearward direction in the vehicle interior side.
Figure 4:
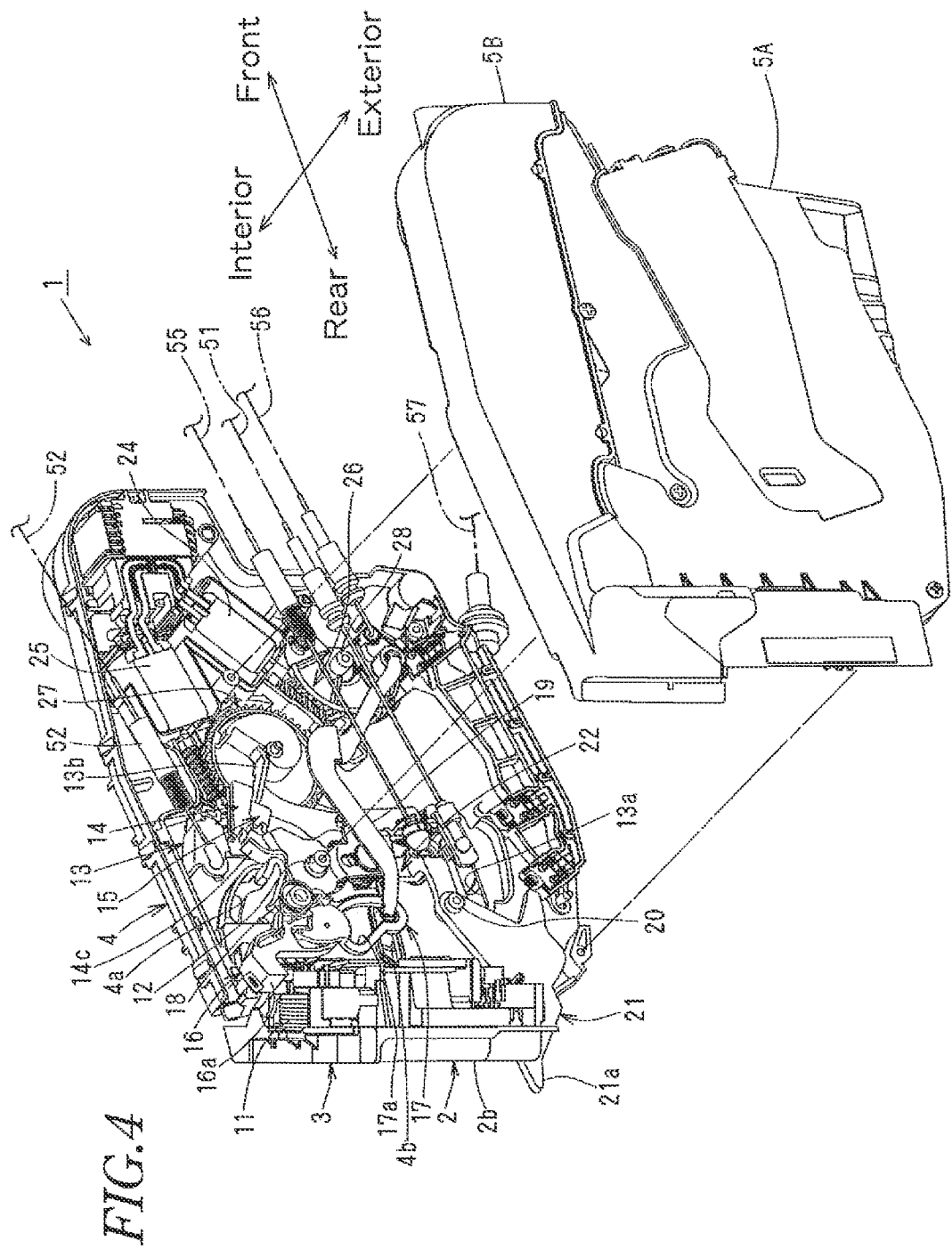
FIG. 4 is an exploded perspective view showing another principal part of the door latch device viewed from an obliquely rearward direction in a vehicle exterior side.

The latch 7 engages with the striker S according to a closing operation of the door D and, against a biasing force of a spring 10 (for example, see FIG. 6) wound on the latch shaft 6, rotates in a closing direction (clockwise direction) at an angle of about 45 degrees from an open position (for example, a position rotated at an angle of about 90 degrees in a counterclockwise direction from a fully-latched position shown in FIGS. 2, 3) to a half-latched position in which the latch 7 barely engages with the striker S, and further rotates to the fully-latched position (for example, a position shown in FIGS. 2, 3) in which the latch 7 completely engages with the striker S. According to an opening operation of the door D, the latch 7 rotates in an opening direction (counterclockwise direction) from the fully-latched position to an open position where the striker S exits.

The ratchet 9 is constantly biased in an engaging direction (clockwise direction in FIGS. 2, 3) around the ratchet shaft 8 by a biasing force of a spring 11 supported by the body 3, abuts against the peripheral edge of the latch 7 when the latch 7 is in the open position, engages with the half-latched engagement portion 7b when the latch 7 is in the half-latched position, and engages with the fully-latched engagement portion 7a to prevents the latch 7 from rotating in the opening direction when the latch 7 is in the fully-latched position. A revolving body 91 (for example, see FIG. 6) revolving integrally with the ratchet 9 is provided on the ratchet shaft 8.

Moreover, when the locking/unlocking mechanism described below is in the unlocked state, the ratchet 9 rotates in a releasing direction (counterclockwise direction in FIGS. 2, 3) against the biasing force of the spring 11 according to the releasing operation of the releasing mechanism described below from each engagement position where the ratchet 9 engages with each of the fully-latched engagement portion 7a and the half-latched engagement portion 7b, disengages from each of the fully-latched engagement portion 7a and the half-latched engagement portion 7b, and allows the latch 7 to rotate in the opening direction to enable the door to open.

The term "latched state" of the engagement mechanism used in the following description means the state in which the striker S engages with the latch 7 and the ratchet 9 engages with the fully-latched engagement portion 7a of the latch 7. The term "unlatched state" means the state in which the latch 7 is in the open position.

Figure 5:
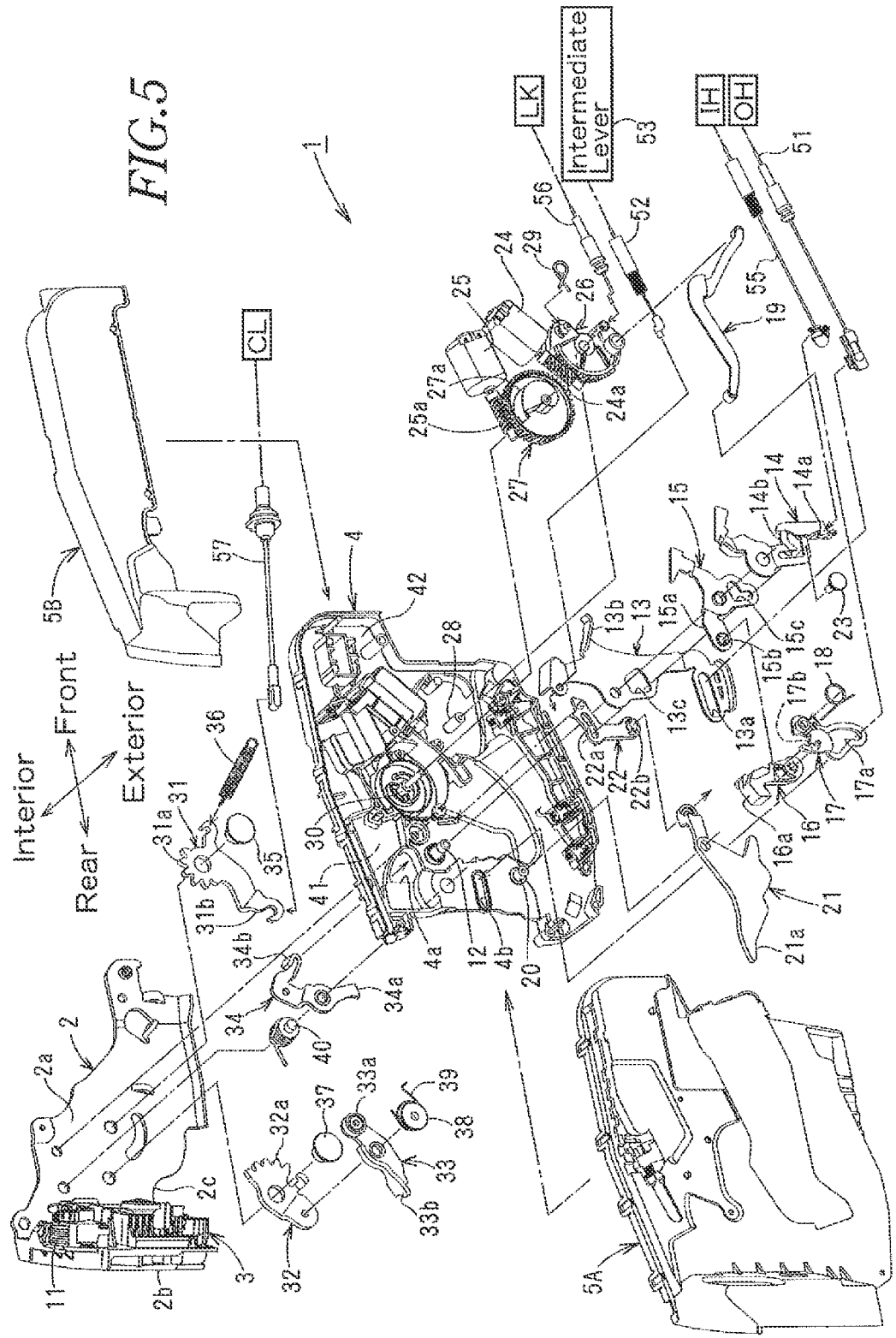
FIG. 5 is an exploded perspective view showing a further principal part of the door latch device viewed from the obliquely rearward direction in the vehicle exterior side.

As shown in FIGS. 4 to 10, an operating mechanism formed by various kinds of members is arranged on the second side surface 42 of the casing 4 facing the vehicle-exterior side. The operating mechanism comprises the releasing mechanism that is released according to modes of door opening operations of the outside handle OH and the inside handle IH, the locking/unlocking mechanism capable of shifting the releasing operation of the releasing mechanism between an effective state and an ineffective state, a childproof mechanism disabling the releasing operation of the releasing mechanism according to the door opening operation of the inside handle IH, and an electric mechanism for electrically operating the various kinds of members. As shown in FIGS. 3, 5, a closure mechanism for forcibly closing the door D from the ajar position to the fully-closed position by coupling with the electric closure device CL is arranged on the first side surface 41 of the casing 4 facing the vehicle-interior side, that is, between the member arrangement portion 2a of the base plate 2 and the first side surface 41 of the casing 4.

Preferably, all members forming the operating mechanism are arranged on the second side surface 42 of the casing 4 facing the vehicle-exterior side, and the members forming the operating mechanism are not arranged at all on the first side surface 41 of the casing 4 facing the vehicle-interior side. Moreover, all members forming the closure mechanism are arranged on the first side surface 41 of the casing 4 facing the vehicle-interior side, and the members forming the closure mechanism are not arranged at all on the second side surface 42 of the casing 4 facing the vehicle-exterior side.

Incidentally, regarding the various kinds of members of the operating mechanism and the closure mechanism described below, each rotation direction is based on a side elevational view from the vehicle-exterior side as shown in FIGS. 6 to 15.

The releasing mechanism comprises the following component members: a first releasing lever 13 supported to the casing 4 pivotably at a predetermined angle by a shaft 12 that is oriented in a vehicle inside-outside direction, a second releasing lever 14 supported to the casing 4 pivotably at a predetermined angle by the shaft 12 to be capable of rotating independently of the first releasing lever 13, and a third releasing lever 15 supported to the casing 4 pivotably at a predetermined angle by the shaft 12 to be capable of rotating independently of the first releasing lever 13 and the second releasing lever 14.

The first releasing lever 13 is supported to the casing 4 by the shaft 12, its lower end portion is formed with a long hole 13a with which one end portion of a first motion transmission member 51 including a Bowden cable or a rod is coupled, and its upper end portion is coupled with one end portion of a second motion transmission member 52 including a Bowden cable or a rod.

The other end portion of the first motion transmission member 51 is coupled with the outside handle OH. Thus, the door opening operation of the outside handle OH is transmitted to the first releasing lever 13 via the first motion transmission member 51, and the first releasing lever 13 is rotated around the shaft 12 in a releasing direction (counterclockwise direction) at a predetermined angle from an initial position shown in FIG. 6. An end portion of an abutting portion 13b formed on the first releasing lever 13 abuts against the third releasing lever 15 from a forward direction to transmit the releasing operation of the first releasing lever 13 in the releasing direction to the second releasing lever 14 via the third releasing lever 15.

The other end portion of the second motion transmission member 52 is coupled with an intermediate lever 53 in the vicinity of the inside handle IH. The intermediate lever 53 is coupled with the fully-open-latch device OL via a third motion transmission member 54 shown in FIG. 1. Thus, the door opening operation of the outside handle OH is transmitted to the fully-open-latch device OL via the first motion transmission member 51, the first releasing lever 13, the second motion transmission member 52, the intermediate lever 53, and the third motion transmission member 54 to release the fully-open-latch device OL. As a consequence, when the door D is held in the fully-open position, the fully-open-latch device OL is released by the door opening operation of the outside handle OH, and the door D can be closed.

The second releasing lever 14 is formed with a coupling portion 14a at its lower end portion, and the coupling portion 14a is coupled with one end portion of a fourth motion transmission member 55 including a Bowden cable or a rod. The other end portion of the fourth motion transmission member 55 is coupled with the inside handle IH. Thus, the door opening operation of the inside handle IH is transmitted to the second releasing lever 14 via the fourth motion transmission member 55, and the second releasing lever 14 is rotated around the shaft 12 in a releasing direction (counterclockwise direction) at a predetermined angle from an initial position shown in FIG. 6. The releasing operation of the second releasing lever 14 in the releasing direction is transmitted to the third releasing lever 15 when the childproof mechanism is in an unlocked state, and is not transmitted to the third releasing lever 15 when the childproof mechanism is in a locked state.

Incidentally, the inside handle IH is normally held in a neutral position, an operation in a rearward direction from the neutral position is the door opening operation, and an operation in a forward direction from the neutral position is the door closing operation. The inside handle IH has a formation in which the door opening operation is possible to be transmitted to the second releasing lever 14 via the fourth motion transmission member 55 and the door closing operation is possible to be transmitted to the fully-open-latch device OL via the intermediate lever 53 and the third motion transmission member 54.

The third releasing lever 15 is pivotally supported to the casing 4 by the shaft 12, and is capable of operating in conjunction with the releasing operation of the first releasing lever 13 or the releasing operation of the second releasing lever 14. By such conjunction, the third releasing lever 15 rotates around the shaft 12 in a releasing direction (counterclockwise direction) at a predetermined angle to transmit its rotation to the locking/unlocking mechanism.

The locking/unlocking mechanism comprises the following component members: the first locking lever 16 of which a lower end portion is connected with a rear end portion of the third releasing lever 15 to be pivotable at a predetermined angle, and the second locking lever 17. The locking/unlocking mechanism is capable of shifting between an unlocked state in which the door D can be opened by the door opening operation of any of the outside handle OH and the inside handle IH and a locked state in which the door D cannot be opened by any of the outside handle OH and the inside handle IH.

The lower end portion of the first locking lever 16 is pivotally supported by a connecting hole 15b formed at a first arm portion 15a of the third releasing lever 15, and the first locking lever 16 is connected with the third releasing lever 15 to be pivotable at a predetermined angle.

A shaft portion 17b formed at an upper end portion of the second locking lever 17 is pivotally supported by the connecting hole 15b of the third releasing lever 15, and the second locking lever 17 is connected with the connecting hole 15b of the third releasing lever 15 to be pivotable at a predetermined angle in the longitudinal direction together with the first locking lever 16.

Figure 6:
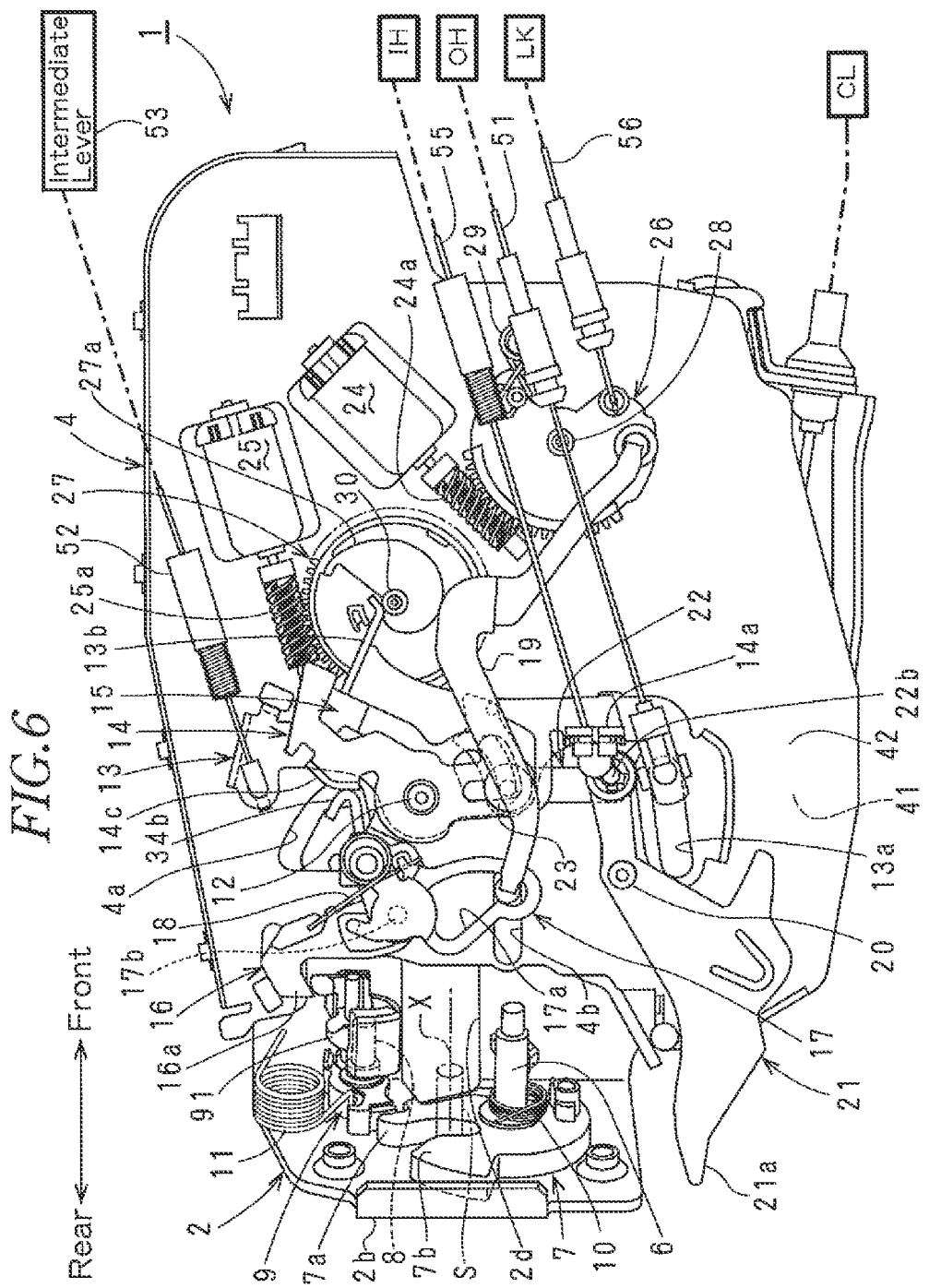
FIG. 6 is a side elevational view showing an engagement mechanism and an operating mechanism of the door latch device viewed from the vehicle-exterior side when a locking/unlocking mechanism is in an unlocked state.

The first and second locking levers 16, 17 normally operates together in a formation held in a normal state in which they are substantially aligned in a vertical direction shown in FIG. 6 by a biasing force of a spring 18 of which one end portion is hooked on the first locking lever 16 and the other end portion is hooked on the second locking lever 17. Thus, the first and second locking levers 16, 17 moves downward at a predetermined quantity in conjunction with the releasing operation of the third releasing lever 15.

A rear end portion of a link 19 of which a front end portion is coupled with a locking/unlocking rotor 26 of the electric mechanism is coupled with a long hole 17a in the vertical direction formed at a lower portion of the second locking lever 17 such that the rear end portion of the link 19 is capable of relatively moving in the vertical direction. Thus, the rotation of the locking/unlocking rotor 26 is transmitted to the second locking lever 17 via the link 19, and the first and second locking levers 16, 17 are rotated around the shaft portion 17b in the clockwise direction at a predetermined angle from an unlocked position shown in FIG. 6 to a locked position shown in FIG. 10 and are rotated inversely.

The rear end portion of the link 19 is coupled with the long hole 17a of the second locking lever 17 to be capable of relatively moving in the vertical direction and is also inserted to a long hole 4b in the longitudinal direction formed on the casing 4 to be capable of moving in the longitudinal direction, the front end portion of the link 19 is coupled with the locking/unlocking rotor 26, and thus, the link 19 moves in the longitudinal direction according to the rotation of the locking/unlocking rotor 26.

Incidentally, the unlocked state of the locking/unlocking mechanism means a state in which the first and second locking levers 16, 17 are in the unlocked position together, and the locked state of the locking/unlocking mechanism means a state in which the first and second locking levers 16, 17 are in the locked position together.

As shown in FIG. 6, in the case where the locking/unlocking mechanism is in the unlocked state, when the third releasing lever 15 is released, the first and second locking levers 16, 17 move downward from the unlocked position. According to this movement, an abutting portion 16a formed in a hook-like shape provided at an upper end portion of the first locking lever 16 abuts against the revolving body 91 integrally revolving with the ratchet 9 from above, and the ratchet 9 rotates in the releasing direction. As a consequence, an engagement relation between the ratchet 9 and the latch 7 is released, and thereby enabling the door to open.

Figure 10:
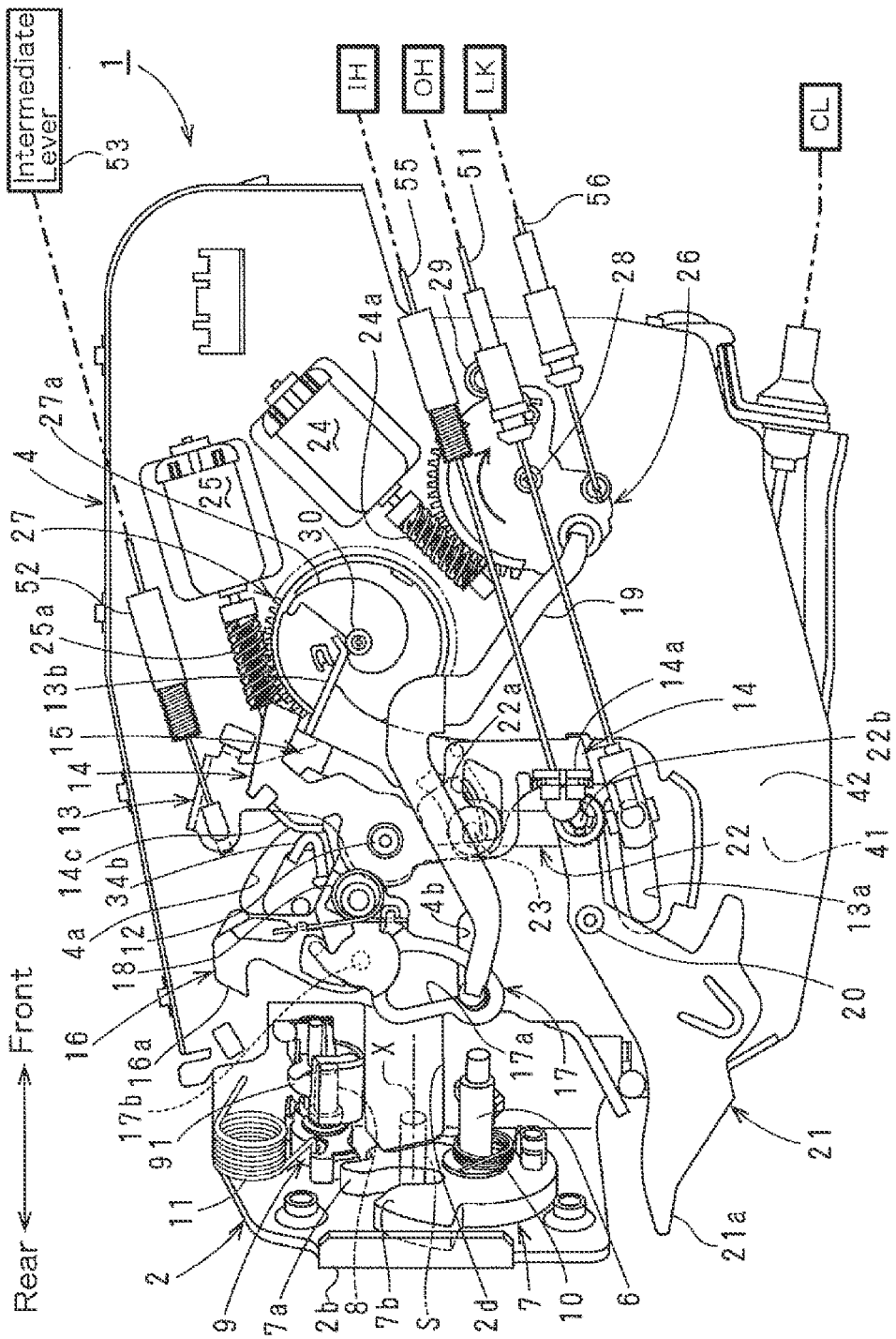
FIG. 10 is a side elevational view showing the engagement mechanism and the operating mechanism of the door latch device viewed from the vehicle-exterior side when the locking/unlocking mechanism is in a locked state.

As shown in FIG. 10, when the locking/unlocking mechanism is in the locked state, the abutting portion 16a of the first locking lever 16 is in a position where it is not capable of abutting against the revolving body 91. Thus, even if the first and second locking levers 16, 17 move downward from the locked position in this state on the basis of the releasing operation of the third releasing lever 15, the abutting portion 16a of the first locking lever 16 moves neutrally without abutting against the revolving body 91 and is not capable of rotating the ratchet 9 in the releasing direction, and thereby disabling the door D to be opened.

The childproof mechanism comprises the following component members: a first childproof lever 21 supported to a lower portion of the casing 4 pivotably at a predetermined angle by the shaft 20 oriented in the vehicle inside-outside direction, a second childproof lever 22 of which a lower end portion 22b is coupled with a front end portion of the first childproof lever 21 pivotably at a predetermined angle, and a sliding pin 23 slidably engaging with a long hole 22a in the longitudinal direction formed on the second childproof lever 22.

The first childproof lever 21 has an operation portion 21a projecting from a rear end surface of the door D. When the operation portion 21a is manually operated in the state of opening the door D, the first childproof lever 21 is capable of rotating in the counterclockwise direction at a predetermined angle from the unlocked position shown in FIG. 6 to the locked position and is also capable of rotating inversely.

The second childproof lever 22 is formed in an inverted L-like shape in the side elevational view, and the lower end portion 22b is coupled with the front end portion of the first childproof lever 21 pivotably at a predetermined angle. The second childproof lever 22 is held in the unlocked position shown in FIG. 6 when the first childproof lever 21 is in the unlocked position, and is held in the locked position upward at a predetermined quantity from the unlocked position when the first childproof lever 21 is in the locked position.

The sliding pin 23 has a shaft-like shape oriented in the vehicle inside-outside direction, and slidably engages with the long hole 22a of the second childproof lever 22 from the vehicle-exterior side by respectively going through a long hole 14b in the vertical direction formed on the second releasing lever 14, a long hole 15c formed at a lower portion of the third releasing lever 15 and having an inverted L-like shape in the side elevational view, and a relief hole 13c formed on the first releasing lever 13.

When the first and second childproof levers 21, 22 are in the unlocked position, the sliding pin 23 is positioned at respective lower ends of the long hole 14b of the second releasing lever 14 and the long hole 15c of the third releasing lever 15 (unlocked position) to make it possible to transmit the releasing operation of the second releasing lever 14 to the third releasing lever 15.

When the first and second childproof levers 21, 22 are in the locked position, the sliding pin 23 is positioned at an upper end of the long hole 15c of the third releasing lever 15 (locked position) to be capable of moving neutrally in an upper portion extending frontward of the long hole 15c, and make it impossible to transmit the releasing operation of the second releasing lever 14 to the third releasing lever 15. Thus, when the locking/unlocking mechanism is in the unlocked state and the childproof mechanism is in the unlocked state, the inside handle IH is enabled to operate to release the third releasing lever 15, and as described above, the ratchet 9 is released so that the door D can be opened. However, when the childproof mechanism is in the locked state, it is impossible to release the third releasing lever 15 by the releasing operation of the second releasing lever 14 on the basis of the operation of the inside handle IH, the inside handle IH is disabled from the opening operation, and thus the door D cannot be opened.

Incidentally, the unlocked state of the childproof mechanism means that the first and second childproof levers 21, 22, and the sliding pin 23 are in each of the unlocked positions, and the locked state of the childproof mechanism means that the first and second childproof levers 21, 22, and the sliding pin 23 are in each of the locked positions.

The electric mechanism comprises the following component members: a locking/unlocking motor 24 arranged in an upper portion of the casing 4, a releasing motor 25 arranged above the locking/unlocking motor 24, the locking/unlocking rotor 26 rotated by driving of the locking/unlocking motor 24, and a releasing rotor 27 rotated by driving of the releasing motor 25.

Preferably, the locking/unlocking motor 24 and the releasing motor 25 are arranged such that they are positioned above an extended line that is extended forward from a baseline X (see FIG. 6) in a horizontal direction of the striker entrance groove 2d of the base plate 2. According to such an arrangement, it is possible to prevent rainwater invading through the striker entrance groove 2d from adhering to the locking/unlocking motor 24 and the releasing motor 25 that are electrical components.

The locking/unlocking motor 24 is normally or inversely driven by a locking/unlocking operation of an operating switch (not shown) provided on a suitable position of the body or a mobile wireless operating switch. A worm 24a fixed to a rotation shaft of the locking/unlocking motor 24 engages with the locking/unlocking rotor 26 that is pivotally supported to the casing 4 by a shaft 28 oriented in the vehicle inside-outside direction, and thus the locking/unlocking motor 24 drives the locking/unlocking rotor 26 normally or inversely.

The locking/unlocking rotor 26 is coupled with the front end portion of the link 19. Thus, when the locking/unlocking mechanism is in the unlocked state, the locking/unlocking rotor 26 is rotated in the clockwise direction at a predetermined angle from the unlocked position shown in FIG. 6 to the locked position shown in FIG. 10 by the normal driving of the locking/unlocking motor 24. According to this rotation, the link 19 moves rearward and the first and second locking levers 16, 17 rotate in the clockwise direction at a predetermined angle around the shaft portion 17b, and it is possible to shift the locking/unlocking mechanism from the unlocked state to the locked state. When the locking/unlocking mechanism is in the locked state, the locking/unlocking rotor 26 is rotated in the counterclockwise direction at a predetermined angle from the locked position shown in FIG. 10 to the unlocked position by the inverse driving of the locking/unlocking motor 24. According to this rotation, the link 19 moves forward and the first and second locking levers 16, 17 rotate in the counterclockwise direction at a predetermined angle around the shaft portion 17b, and it is possible to shift the locking/unlocking mechanism from the locked state to the unlocked state.

Moreover, the locking/unlocking rotor 26 is coupled with the locking operation knob LK provided on the vehicle-interior side of the door D via a fifth motion transmission member 56. On the basis of the operation of the locking operation knob LK, the locking/unlocking rotor 26 is capable of rotating from the unlocked position to the locked position and capable of rotating inversely, and is possible to shift the locking/unlocking mechanism between the unlocked state and the locked state in the same as the driving by the locking/unlocking motor 24. The locking/unlocking rotor 26 is held in the unlocked position and the locked position by a biasing force of a turnover spring 29 supported by the casing 4.

The releasing motor 25 is driven when a detection switch (not shown) detects the operation of the operating switch provided on a suitable position of the body or the wireless operating switch, or the door opening operation of the outside handle OH or the inside handle IH. By this driving, the releasing motor 25 rotates the releasing rotor 27 in a releasing direction (clockwise direction) from an initial position shown in FIG. 6 because a worm 25a fixed to a rotation shaft of the releasing motor 25 engages with the releasing rotor 27 pivotally supported to the casing 4 by a shaft 30.

A cam portion 27a is provided on a rotary surface of the releasing rotor 27. The abutting portion 13b of the first releasing lever 13 slidably abuts against the cam portion 27a. Thus, when the releasing rotor 27 rotates in the releasing direction at a predetermined angle, the first releasing lever 13 rotates in the releasing direction at a predetermined angle. By this rotation, the ratchet 9 is released via the second and third releasing levers 14, 15, and thereby enabling the door D to open. After the door D is opened, when an electric supply for the releasing motor 25 is stopped, the releasing rotor 27 returns to the initial position before the operation by a biasing force of a spring (not shown).

As shown in FIGS. 3, 5, 11 to 15, the closure mechanism comprises the following component members: a first and second closing levers 31, 32, a sub lever 33, and a canceling lever 34. These members are arranged between the member arrangement portion 2a of the base plate 2 and the casing 4 facing the member arrangement portion 2a, that is, they are arranged on the first side surface 41 opposite the second side surface 42 on which there are arranged the releasing mechanism, the locking/unlocking mechanism, the childproof mechanism, and the electric mechanism.

As described above, since the closure mechanism is arranged on the first side surface 41 opposite the second side surface 42 of the casing 4 on which the operating mechanism is arranged, it is possible to efficiently arrange the members of the operating mechanism and the closure mechanism at respective optimized positions on both sides of the casing 4, and a rotation force of the latch 7 affecting the first and second closing levers 31, 32 can be absorbed by the base plate 2 made of metal. Therefore, it is possible to downsize the casing 4, and thus downsize the whole door latch device 1.

The first closing lever 31 is supported to the member arrangement portion 2a of the base plate 2 pivotably at a predetermined angle by a shaft 35 oriented in the vehicle inside-outside direction, and a coupling portion 31b at a lower end portion of the first closing lever 31 is coupled with an output lever (not shown) of the electric closure device CL via a sixth motion transmission member 57 including a Bowden cable or a rod. Thus, when the output lever rotates on the basis of driving of a motor (not shown) of the electric closure device CL, the first closing lever 31 rotates in the closing direction (counterclockwise direction) at a predetermined angle from an initial position shown in FIG. 11 against a biasing force of a spring 36, and transmits its rotation to a second closing lever 32.

Preferably, as shown in FIG. 2, the coupling portion 31b of the first closing lever 31 with which a terminal portion 57a of the sixth motion transmission member 57 is coupled is provided so as to expose outward from a notch portion 2c formed at a lower portion of the member arrangement portion 2a of the base plate 2. Thus, even if the casing 4 is fixed to the base plate 2 and the closure mechanism is arranged between the member arrangement portion 2a of the base plate 2 and the side surface of the casing 4, it is possible to easily and securely couple the terminal portion 57a of the sixth motion transmission member 57 with the coupling portion 31b of the first closing lever 31 by a visual operation.

The second closing lever 32 is supported to the member arrangement portion 2a of the base plate 2 pivotably at a predetermined angle by a shaft 37 oriented in the vehicle inside-outside direction. The second closing lever 32 is provided with a teeth portion 32a on its peripheral portion, which is engaged with a teeth portion 31a formed on a peripheral portion of the first closing lever 31. Thus, the second closing lever 32 rotates in the closing direction (clockwise direction) from an initial position shown in FIG. 11 at a predetermined angle in conjunction with the rotation in the closing direction of the first closing lever 31.

Figure 11:
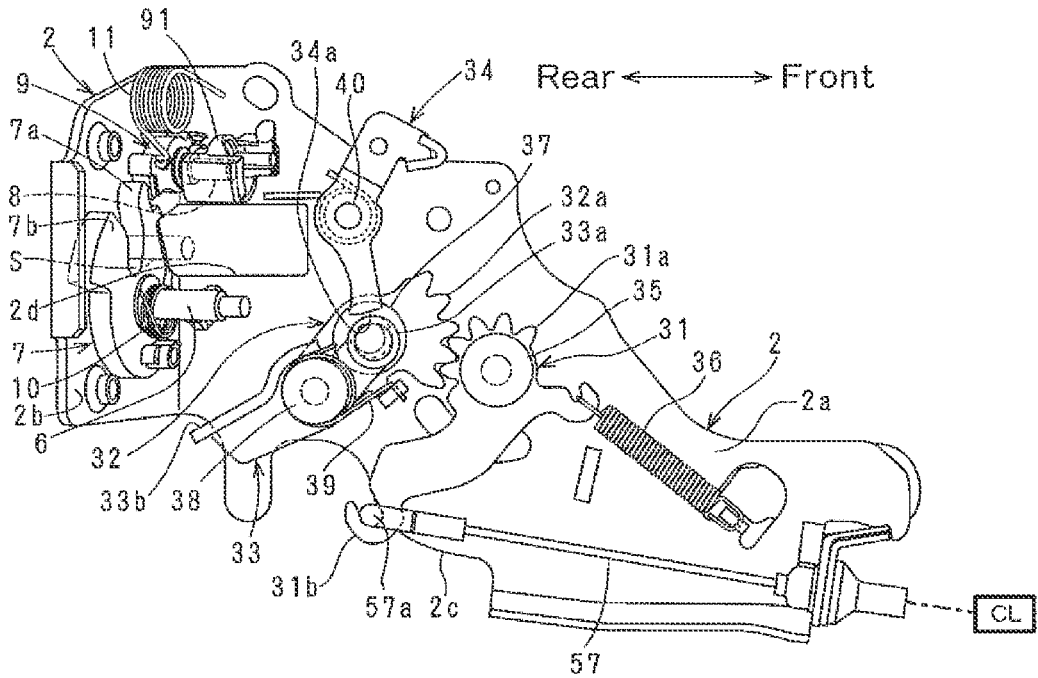
FIG. 11 is a side elevational view showing the engagement mechanism and the operating mechanism of the door latch device viewed from the vehicle-exterior side when the engagement mechanism is in a fully-latched state and a closure mechanism is in an initial state.

A center portion in the longitudinal direction of the sub lever 33 is coupled with a lower end portion of the second closing lever 32 pivotably at a predetermined angle by a coupling shaft 38 oriented in the vehicle inside-outside direction, the sub lever 33 is biased in a rotation direction by a spring 39, and a rotary roller 33a formed at a front end portion of the sub lever 33 is normally abutted against a blocking portion 34a formed at a lower end portion of the canceling lever 34 from below to hold the sub lever 33 in an initial position shown in FIG. 11 in a state of blocking its rotation in the counterclockwise direction around the coupling shaft 38.

A center of the rotary roller 33a corresponds to a center of the shaft 37 that is a rotation center of the second closing lever 32. Thus, when the second closing lever 32 rotates in a state that the sub lever 33 is blocked from rotating in the counterclockwise direction around the coupling shaft 38 by the canceling lever 34, the sub lever 33 rotates around the shaft 37 integrally with the second closing lever 32, too.

When the sub lever 33 rotates around the shaft 37 integrally with the second closing lever 32, an output portion 33b formed at a rear end portion of the sub lever 33 lifts an arm portion 7c formed on the latch 7 that is in the half-latched position to forcibly rotate the latch 7 from the half-latched position to the fully-latched position.

The canceling lever 34 is supported to the casing 4 pivotably at a predetermined angle by a shaft 40 oriented in the vehicle inside-outside direction, and is rotated in a canceling direction (counterclockwise direction) at a predetermined angle from an initial position shown in FIG. 11 on the basis of the releasing operation of the second releasing lever 14, that is, the door opening operation of the outside handle OH or the inside handle IH (this rotation is referred to as "canceling operation" below).

The canceling lever 34 is formed with a communicating portion 34b on its upper portion, the communicating portion 34b is made to go through from the first side surface 41 to the second side surface 42 of the casing 4 via an opening 4a provided in the casing 4 to protrude from the second side surface 42 of the casing 4, one portion 14c of the second releasing lever 14 is made to abut in a rotation direction against the communicating portion 34b protruding from the second side surface 42 of the casing 4, and thereby achieving the canceling operation of the canceling lever 34 on the basis of the door opening operation of the outside handle OH or the inside handle IH.

Figure 14:
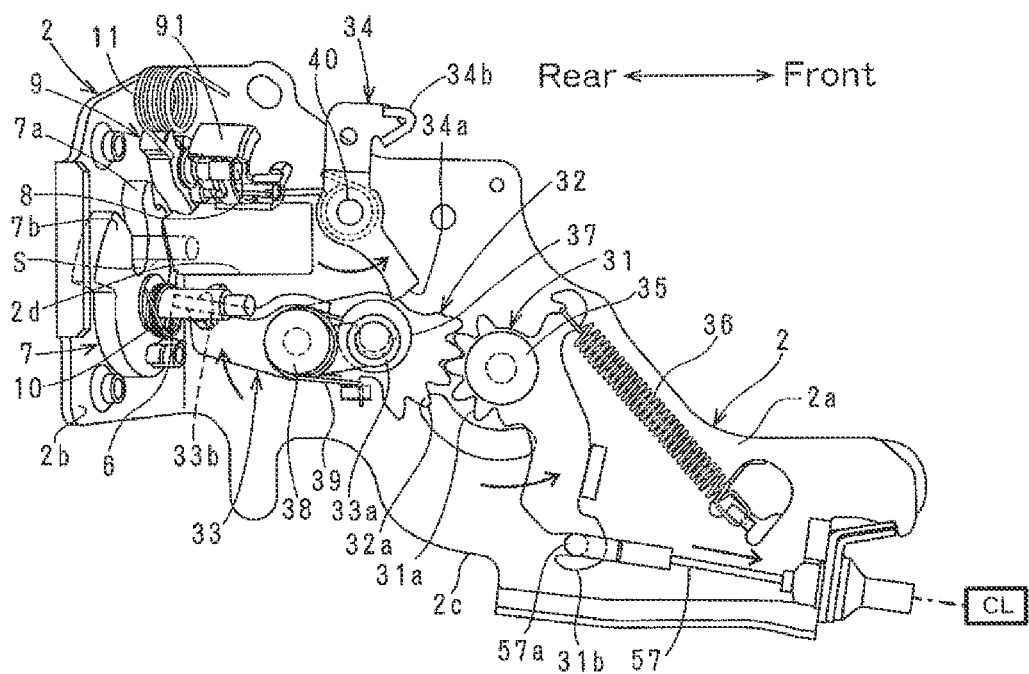
FIG. 14 is a side elevational view showing the engagement mechanism and the operating mechanism of the door latch device viewed from the vehicle-exterior side when the closure mechanism is operated to be canceled in a progress of the closing operation.

As shown in FIG. 11, when the canceling lever 34 is in the initial position, its blocking portion 34a is positioned to abut against a top of the rotary roller 33a of the sub lever 33, and enables the sub lever 33 and the second closing lever 32 to rotate integrally by blocking the sub lever 33 from rotation in the counterclockwise direction around the coupling shaft 38. Moreover, as shown in FIG. 14, when the canceling lever 34 is in a position where it has rotated in the canceling direction, the blocking portion 34a is in a retreated position where it is impossible to abut against the rotary roller 33a of the sub lever 33, and disables the second closing lever 32 from transmitting its closing operation to the latch 7 by making the sub lever 33 to be rotatable in the counterclockwise direction around the coupling shaft 38.

As described above, in the case where the canceling lever 34 is in the initial position, when the second closing lever 32 is operated to close by the rotation of the first closing lever 31 on the basis of motive power of the electric closure device CL, the sub lever 33 is also operated to close around the shaft 37 together with the second closing lever 32. According to this operation, the output portion 33b of the sub lever 33 lifts the arm portion 7c of the latch 7 that is in the half-latched position from below to forcibly rotate the latch 7 from the half-latched position to the fully-latched position.

However, when the canceling lever 34 is released on the basis of the door opening operation of the outside handle OH or the inside handle IH in a progress of operating the first and second closing levers 31, 32 for closing by the motive power of the electric closure device CL, the sub lever 33 is released to rotate in the counterclockwise direction. Then, the sub lever 33 abutted against the arm portion 7c of the latch 7 is rotated in the counterclockwise direction and the closing operation of the second closing lever 32 cannot be transmitted to the latch 7. Thus, even if the latch 7 is in a progress of the forcible rotation to the fully-latched position, the transmission process of the motive power of the electric closure device CL can be cut off to disable the electric closure device CL from transmitting its motive power, and it is possible to avoid being caught in the door D.

Next, there is described the main operation of the door latch device 1 of the present embodiment. Incidentally, in all cases described below, the door latch device 1 is in the state where the childproof mechanism is in the unlocked state.

<A Case where, when Door D is in Fully-Closed Position and Locking/Unlocking Mechanism is in Unlocked State, Inside Handle IH is Operated to Open Door>

Figure 7:
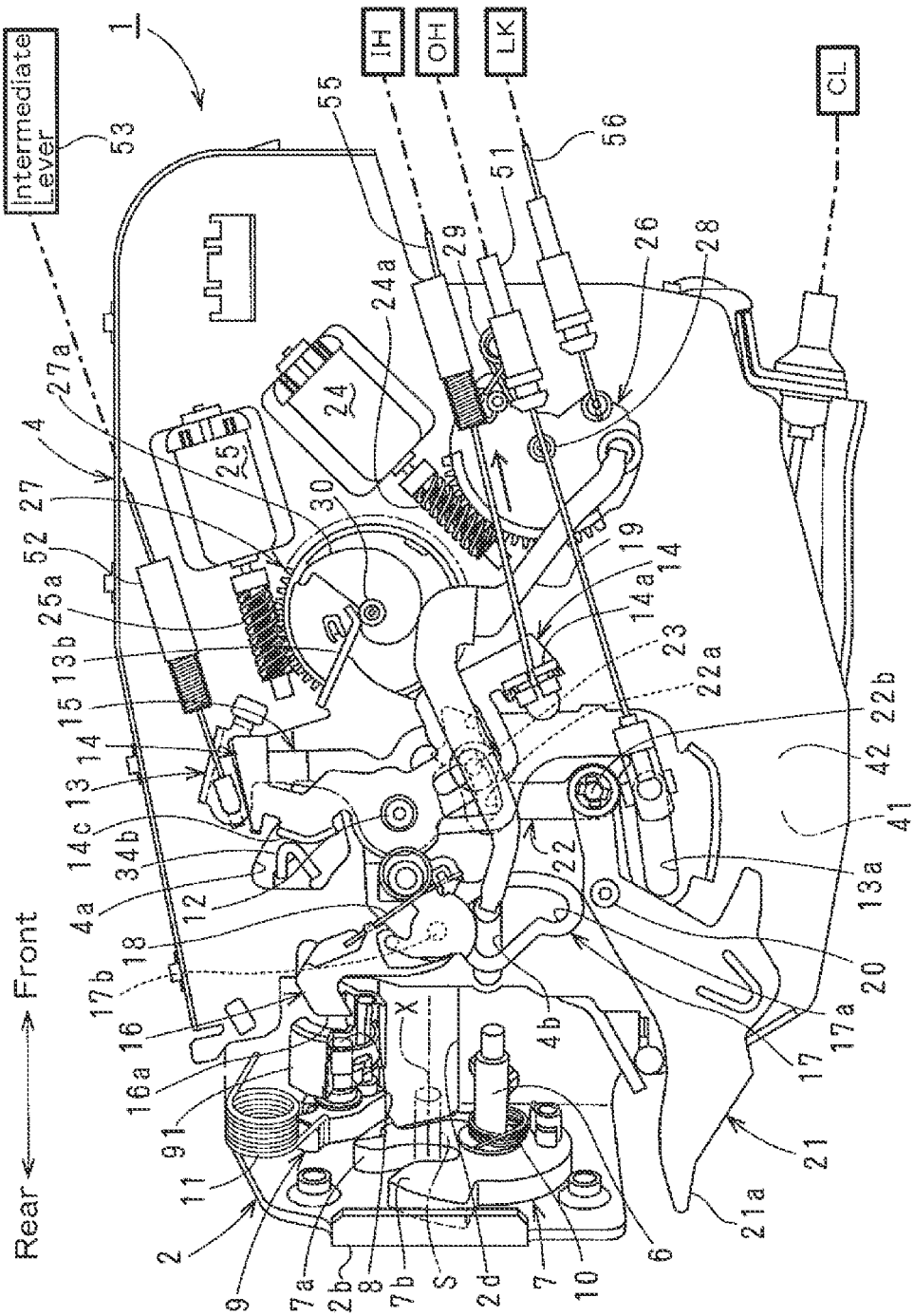
FIG. 7 is a side elevational view showing the engagement mechanism and the operating mechanism of the door latch device viewed from the vehicle-exterior side when an inside handle is operated to open the door in the case that the locking/unlocking mechanism is in the unlocked state.

This case is described by reference to FIGS. 6, 7. The door opening operation of the inside handle IH is transmitted to the second releasing lever 14 via the fourth motion transmission member 55. The second releasing lever 14 is released in the counterclockwise direction around the shaft 12 from the initial position shown in FIG. 6. Thus, as shown in FIG. 7, the releasing operation of the second releasing lever 14 is transmitted to the third releasing lever 15 via the sliding pin 23. On the basis of the releasing operation of the third releasing lever 15, the first and second locking levers 16, 17 are released downward from the unlocked position. Then, the abutting portion 16a abuts against the revolving body 91 revolving integrally with the ratchet 9 from above so that the first locking lever 16 releases the ratchet 9. As a consequence, the engagement relation between the latch 7 and the ratchet 9 is released, and thereby enabling the door D to open.

<A Case where, when Door D is in Fully-Closed Position and Locking/Unlocking Mechanism is in Unlocked State, Outside Handle OH is Operated to Open Door>

Figure 8:
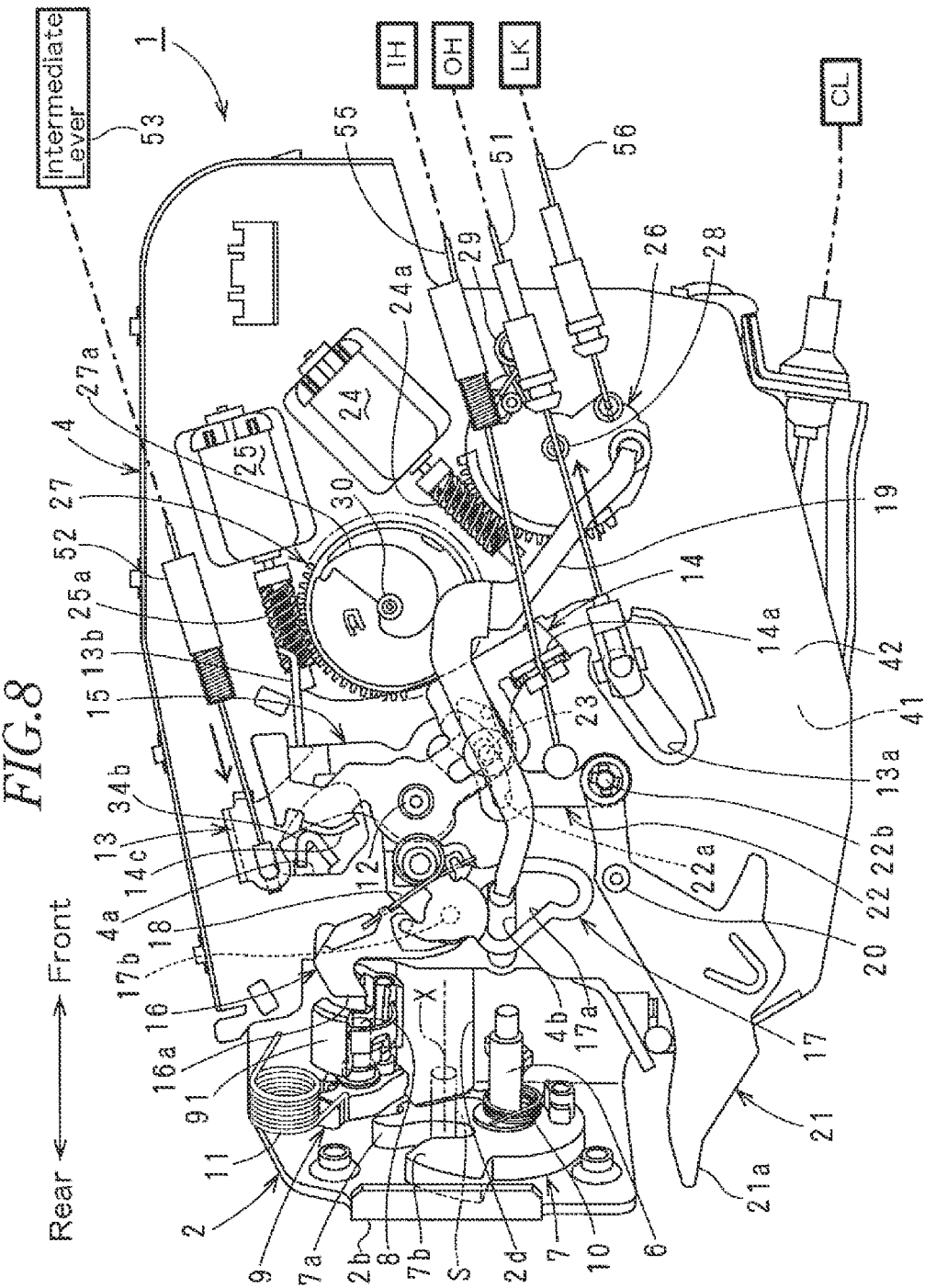
FIG. 8 is a side elevational view showing the engagement mechanism and the operating mechanism of the door latch device viewed from the vehicle-exterior side when an outside handle is operated to open the door in the case that the locking/unlocking mechanism is in the unlocked state.

This case is described by reference to FIGS. 6, 8. The door opening operation of the outside handle OH is transmitted to the first releasing lever 13 via the first motion transmission member 51. The first releasing lever 13 is released in the counterclockwise direction around the shaft 12 from the initial position shown in FIG. 6. As shown in FIG. 8, a rear portion of the abutting portion 13b abuts against the third releasing lever 15 to transmit the releasing operation of the first releasing lever 13 to the third releasing lever 15. Thus, on the basis of the releasing operation of the third releasing lever 15, the first and second locking levers 16, 17 are released downward from the unlocked position. Then, the abutting portion 16a abuts against the revolving body 91 of the ratchet 9 from above so that the first locking lever 16 releases the ratchet 9. As a consequence, the engagement relation between the latch 7 and the ratchet 9 is released, and thereby enabling the door D to open.

<A Case where, when Door D is in Fully-Closed Position and Locking/Unlocking Mechanism is in Unlocked State, Releasing Motor 25 is Driven on the Basis of Operation of Operating Switch>

Figure 9:
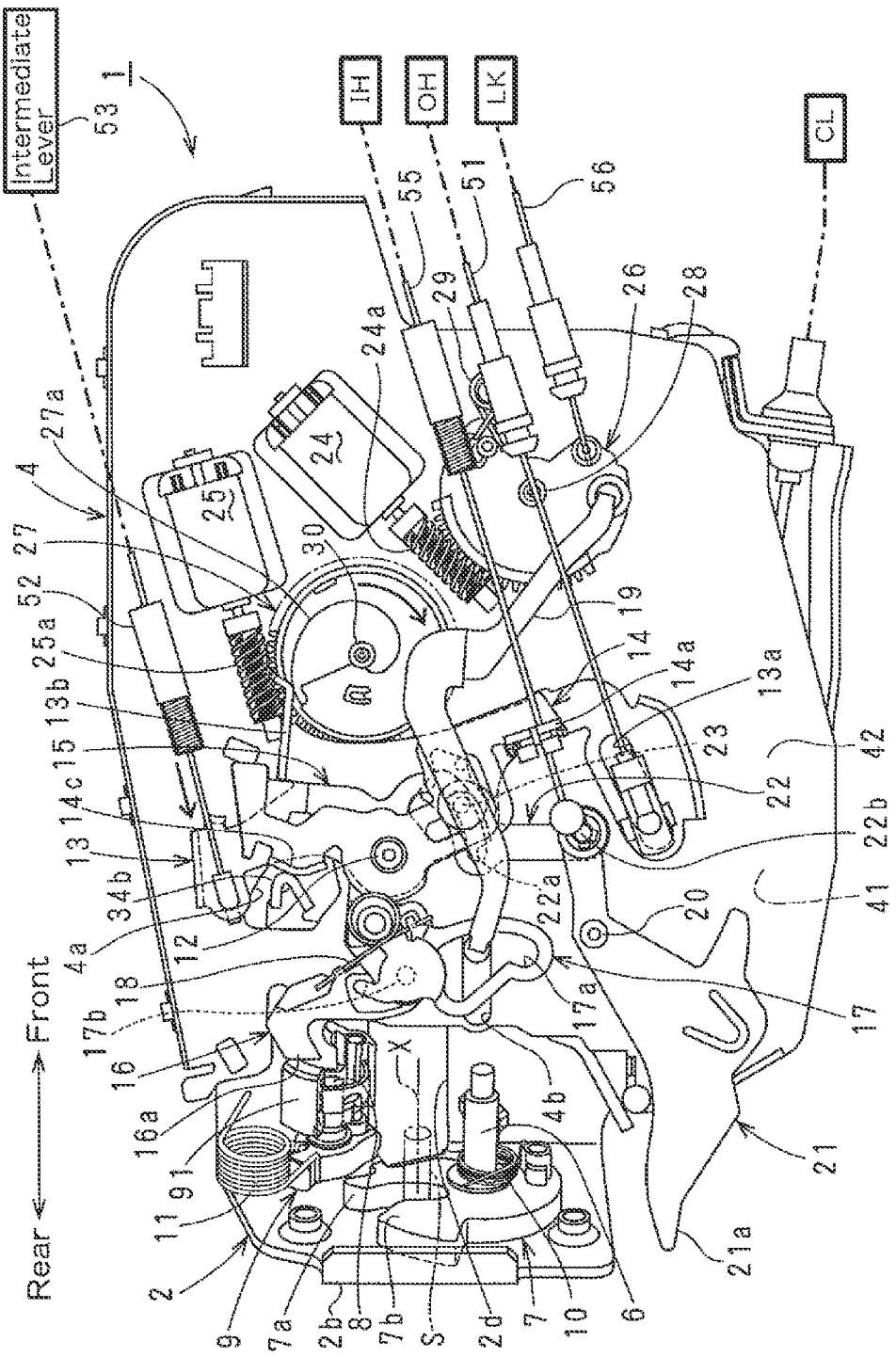
FIG. 9 is a side elevational view showing the engagement mechanism and the operating mechanism of the door latch device viewed from the vehicle-exterior side when a releasing motor is driven in the case that the locking/unlocking mechanism is in the unlocked state.

This case is described by reference to FIGS. 6, 9. The driving of the releasing motor 25 is transmitted to the first releasing lever 13 via the worm 25a, the releasing rotor 27, and the cam portion 27a. The first releasing lever 13 is released in the counterclockwise direction around the shaft 12 from the initial position shown in FIG. 6. As shown in FIG. 9, the rear portion of the abutting portion 13b abuts against the third releasing lever 15 to transmit the releasing operation of the first releasing lever 13 to the third releasing lever 15. Thus, on the basis of the releasing operation of the third releasing lever 15, the first and second locking levers 16, 17 are released downward from the unlocked position. Then, the abutting portion 16a abuts against the revolving body 91 of the ratchet 9 from above so that the first locking lever 16 releases the ratchet 9. As a consequence, the engagement relation between the latch 7 and the ratchet 9 is released, and thereby enabling the door D to open.

Incidentally, when the locking/unlocking mechanism is in the locked state, the locking/unlocking motor 24 is previously controlled to drive on the basis of the door opening operation of the operating switch to shift the locking/unlocking mechanism from the locked state to the unlocked state, and then the releasing motor 25 is controlled to drive. As a consequence, even if the locking/unlocking mechanism is in the locked state, the door D can be opened by one operation on the basis of the door opening operation of the operating switch.

<A Case where, when Door D is in Fully-Closed Position and Locking/Unlocking Mechanism is in Unlocked State, Locking/Unlocking Motor 24 is Driven on the Basis of Locking Operation of Operating Switch>

This case is described by reference to FIGS. 6, 10. The driving of the locking/unlocking motor 24 is transmitted to the second locking lever 17 via the worm 24a, the locking/unlocking rotor 26, and the link 19. Then, the first and second locking levers 16, 17 rotate in the clockwise direction around the shaft portion 17b of the second locking lever 17 at a predetermined angle from the unlocked position shown in FIG. 6 to the locked position shown in FIG. 10. Thus, the locking/unlocking mechanism is shifted from the unlocked state to the locked state.

When the locking/unlocking mechanism is shifted to the locked state, the abutting portion 16a of the first locking lever 16 is positioned where it is not capable of abutting against the revolving body 91 of the ratchet 9, and the first locking lever 16 cannot release the ratchet 9 even if the first locking lever 16 is moved downward by the releasing operation of the third releasing lever 15 on the basis of the operation of the outside handle OH or the inside handle IH. Therefore, even if the outside handle OH and the inside handle IH are operated to open the door, the door D cannot be opened.

<A Case where Electric Closure Device CL is Operated to Close>

Figure 12:
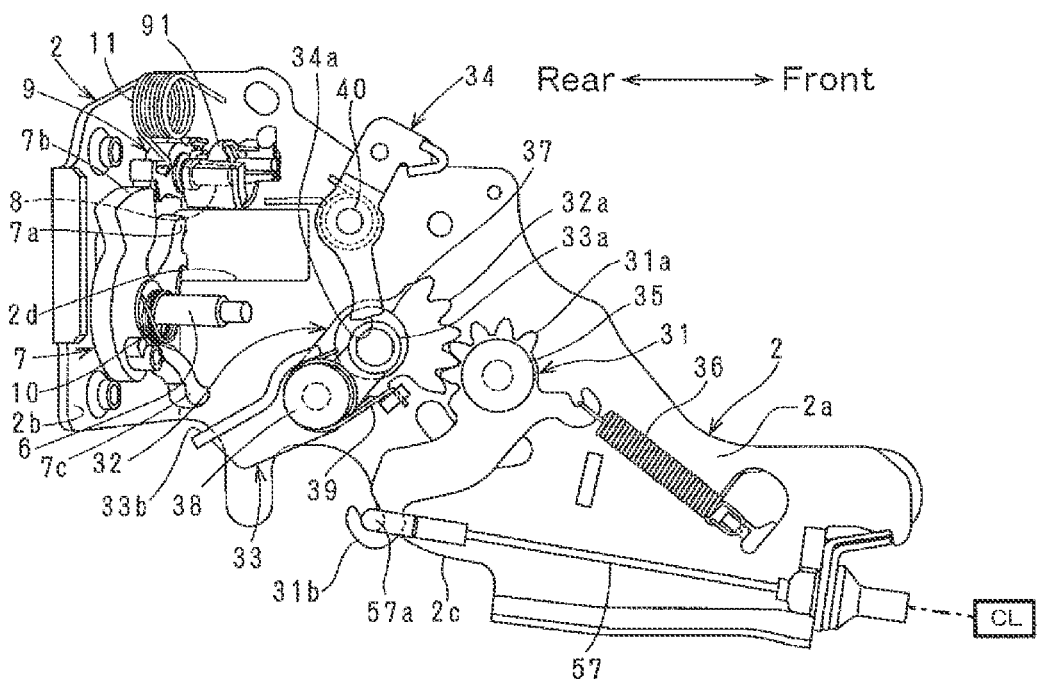
FIG. 12 is a side elevational view showing the engagement mechanism and the operating mechanism of the door latch device viewed from the vehicle-exterior side when the engagement mechanism is in a half-latched state and the closure mechanism is in the initial state.
Figure 13:
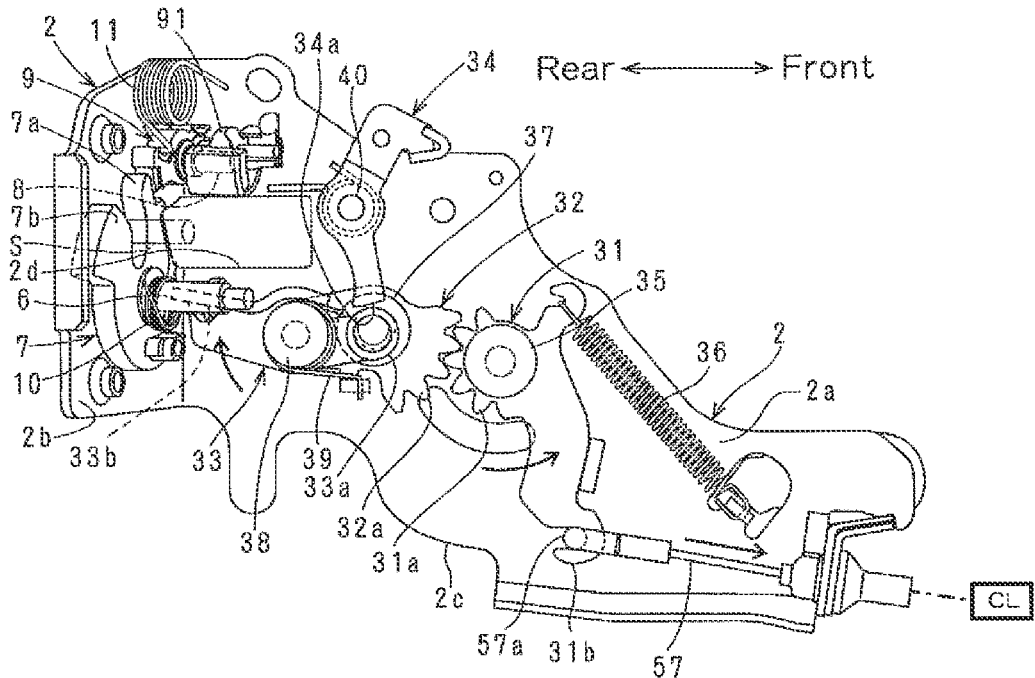
FIG. 13 is a side elevational view showing the engagement mechanism and the operating mechanism of the door latch device viewed from the vehicle-exterior side when the closure mechanism is in a progress of a closing operation.

This case is described by reference to FIGS. 11 to 13. FIG. 11 is a side elevational view showing a principal part when the latch 7 is in the fully-latched position. FIG. 12 is a side elevational view showing the principal part when the latch 7 is in the half-latched position. FIG. 13 is a side elevational view showing the principal part when the closure device CL is in the closing operation.

When the door D is open, the latch 7 is in the open position and other members are in the respective initial positions. When the door D is closed in this state, the striker S engages with the engagement groove 7d of the latch 7, the latch 7 rotates from the open position to the half-latched position shown in FIG. 12, and this rotation is detected by a detection switch (not shown). On the basis of this detection, the closure device CL is controlled to drive by a circuit controller (not shown). The motive power of the electric closure device CL is transmitted to the first closing lever 31 via the sixth motion transmission member 57. Thus, as shown in FIG. 13, the first closing lever 31 is operated to close in the counterclockwise direction around the shaft 35 from the initial position, and the second closing lever 32 is operated to close in the clockwise direction around the shaft 37 from the initial position. As a consequence, the output portion 33b of the sub lever 33 lifts the arm portion 7c of the latch 7 from below to forcibly rotate the latch 7 from the half-latched position to the fully-latched position as shown in FIG. 13. Then, when the door D moves from the ajar position to the fully-closed position by the rotation of the latch 7, the electric closure device CL is controlled to reverse so that the first and second closing levers 31, 32 are returned to each of the initial positions as shown in FIG. 11.

<A Case where Closing Operation by Electric Closure Device CL is Canceled>

Figure 15:
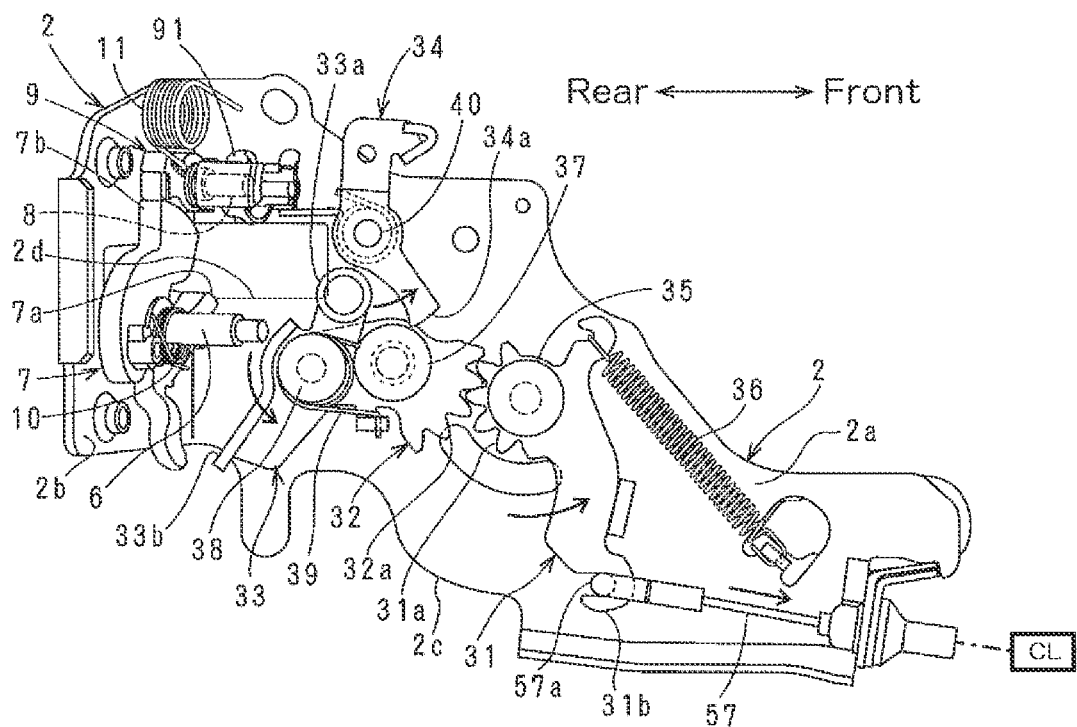
FIG. 15 is a side elevational view showing the engagement mechanism and the operating mechanism of the door latch device viewed from the vehicle-exterior side when the closing operation of the closure mechanism is cut off.

The operation when the closing operation is canceled is described by reference to FIGS. 14, 15. When the closing operation has to be canceled urgently in a progress of the above-described closing operation of the electric closure device CL owing to that, for example, something is caught between the door D and an entrance, the outside handle OH or the inside handle IH is operated to open the door.

The door opening operation of the outside handle OH or the inside handle IH is conclusively transmitted to the canceling lever 34 via the second releasing lever 14 regardless of the locking/unlocking state. As shown in FIG. 14, the canceling lever 34 rotates in the counterclockwise direction around the shaft 40 at a predetermined angle from the initial position to carry out the canceling operation such that the blocking portion 34a retreats to a position where it is not capable of abutting against the rotary roller 33a of the sub lever 33.

As shown in FIG. 14, when the canceling lever 34 carries out the canceling operation, the sub lever 33 is made to be in a state of rotatable in the counterclockwise direction around the coupling shaft 38. Thus, the sub lever 33 that has abutted against the arm portion 7c of the latch 7 to rotate the latch 7 in the fully-latched position is made to be rotatable in the counterclockwise direction around the coupling shaft 38 and is made to be impossible to transmit the closing operation to the latch 7. As a consequence, the closing operation of the electric closure device CL is cut off between the second closing lever 32 and the latch 7. Simultaneously, since the third releasing lever 15 and the first locking lever 16 operate on the basis of the releasing operation of the second releasing lever 14, it is possible to release the ratchet 9 to immediately open the door D, and to avoid a possibility of being caught.

As described above, in the motor-vehicle door latch device 1 of the present embodiment, all of the members forming the closure mechanism are arranged between the first side surface 41 of the casing 4 and the base plate 2, and all of the members forming the releasing mechanism, the locking/unlocking mechanism, and the electric mechanism are arranged on the second side surface 42 of the casing 4. Therefore, it is possible to arrange the members of the closure mechanism, the releasing mechanism, the locking/unlocking mechanism, and the electric mechanism at respective optimized positions, to downsize the casing 4, to reduce the motion transmission members for connecting with a relay operating device as in a conventional formation, and to optimize its assembling operation for the door D.

As described above, the foregoing relates to one embodiment of the present invention, but the present invention is not limited to the above one embodiment and various changes and modifications may be added to the present embodiment without departing from the gist of the present invention as follows.

(a) The childproof mechanism is omitted, and the second and third releasing levers of the releasing mechanism are formed in an integral structure.

(b) The first and second closing levers of the closure mechanism are formed in an integral structure.

What is claimed is:

1. A motor-vehicle door latch device fixed to a door and holding the door in a closed position by engaging with a striker on a motor vehicle body, comprising:

an engagement mechanism that comprises a latch engaging with the striker and a ratchet engaging with the latch when the door is closed;

a body housing the engagement mechanism;

a base plate that is formed in an L-shape in a plan view, and is fixed to the body and is provided with a striker entrance groove into which the striker enters when the door is closed, wherein the base plate has a member arrangement portion facing an internal side surface of an inner panel of the door and a cover portion that is formed to be bent at a rear portion of the member arrangement portion and is fixed to an internal surface of the inner panel of the door together with the body, the striker entrance groove is provided in a corner portion of a bent portion formed between the member arrangement portion and the cover portion, and the base plate is fixed to the body such that the cover portion entirely covers a part housing the engagement mechanism in the body except the striker entrance groove;

a casing fixed to the base plate such that a first side surface faces a side surface on a vehicle-exterior side of the member arrangement portion of the base plate;

a releasing mechanism comprising a releasing lever that is released on the basis of a door opening operation of a manual opener device provided on the door;

a locking/unlocking mechanism capable of shifting between an unlocked state and a locked state, wherein the unlocked state enables the ratchet to disengage from the latch by making it possible to transmit a releasing operation of the releasing lever to the ratchet and the locked state disables the ratchet to disengage from the latch by making it impossible to transmit the releasing operation of the releasing lever to the ratchet;

an electric mechanism comprising a locking/unlocking motor that is capable of shifting the locking/unlocking mechanism electrically between the unlocked state and the locked state and a releasing motor that enables the releasing lever to be released electrically; and a closure mechanism rotating the latch from a half-latched position to a fully-latched position, wherein all members forming the releasing mechanism, the locking/unlocking mechanism, and the electric mechanism are arranged to be supported on a second side surface opposite the first side surface of the casing that faces the side surface of the member arrangement portion of the base plate, wherein all members forming the closure mechanism are arranged to be supported on the side surface of the member arrangement portion of the base plate facing the first side surface of the casing, and wherein each of the latch and the ratchet of the engagement mechanism is supported to the part housing the engagement mechanism in the body by a pivot shaft, is covered with the cover portion, and has a flat shape with a plane perpendicular to the pivot shaft on both sides, and therefore the engagement mechanism is supported to the body fixed to the base plate such that the respective planes on a side of the cover portion of the latch and the ratchet face the cover portion that is bent in the L-shape in the plan view with respect to the member arrangement portion on which the closure mechanism is arranged, and the engagement mechanism is operated linking with the closure mechanism, in the base plate formed in the L-shape in the plan view.

2. The motor-vehicle door latch device according to claim 1, wherein the closure mechanism comprises:
   a closing lever that is supported on the side surface of the member arrangement portion of the base plate facing the first side surface of the casing pivotably at a predetermined angle and is rotated by coupling with an electric closure device separate from the motor-vehicle door latch device and arranged in a predetermined position in the door; and
   a sub lever that is coupled with the closing lever and is integrally rotated with the closing lever to rotate the latch from a half-latched position to a fully-latched position.

3. The motor-vehicle door latch device according to claim 2,
   wherein the closure mechanism further comprises a canceling lever that is possible to shift between an initial position where the canceling lever is capable of transmitting the rotation of the sub lever by the closing lever to the latch and a canceling position where the canceling lever is not capable of transmitting said rotation, and
   wherein the canceling lever has a communicating portion going through from the first side surface to the second side surface of the casing via an opening provided in the casing to protrude from the second side surface of the casing, and when the releasing lever is released, the releasing lever abuts against the communicating portion to move the canceling lever from the initial position to the canceling position.

4. The motor-vehicle door latch device according to claim 1, wherein the locking/unlocking motor and the releasing motor are arranged above an extended line that is extended forward from a baseline in a horizontal direction of the striker entrance groove.

5. The motor-vehicle door latch device according to claim 1, wherein the base plate formed in the L-shape in the plan view is made of metal.

6. The motor-vehicle door latch device according to claim 2, wherein the closing lever is coupled with the electric closure device separate from the motor-vehicle door latch device via a motion transmission member including a Bowden cable or a rod, and a coupling portion at a lower end portion of the closing lever with which a terminal portion of the motion transmission member is directly coupled is provided so as to expose outward from a notch portion formed in a lower portion of the member arrangement portion of the base plate.

7. The motor-vehicle door latch device according to claim 1, wherein the door is a sliding door that is forcibly closed from an ajar position to a fully-closed position by the electric closure device.

* * * * *